Sept. 28, 1926.

S. G. NEAL ET AL 1,601,585

TRIPLE VALVE FOR AIR BRAKE APPARATUS

Original Filed July 22, 1925    4 Sheets-Sheet 1

Fig.1

Inventors:
Spencer G. Neal,
William Astle and
Edward P. Wilson

BY
ATTORNEYS

Sept. 28, 1926.

S. G. NEAL ET AL 1,601,585

TRIPLE VALVE FOR AIR BRAKE APPARATUS

Original Filed July 22 1925    4 Sheets-Sheet 4

Inventors:
Spencer G. Neal,
William Astle and
Edward P. Wilson

BY

ATTORNEYS

Patented Sept. 28, 1926.

1,601,585

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

TRIPLE VALVE FOR AIR-BRAKE APPARATUS.

Application filed July 22, 1925, Serial No. 45,317. Renewed July 8, 1926.

This invention relates to improvements in that type of triple valves which operate upon a reduction of brake pipe pressure to connect a service application reservoir to a control chamber to thereby build up in the control chamber a pressure equal to the desired brake cylinder pressure, said desired brake cylinder pressure being dependent upon and at a predetermined ratio to the pressure reduction in the brake pipe. The pressure in the control chamber moves an application valve to connect a supply reservoir to the brake cylinder. When the brake cylinder pressure has been built up to an equality with the pressure previously established in the control chamber the application valve will be closed. It is the object of this invention to simplify and improve the operation of triple valves of this type.

In order to simplify the description of the triple valve the various parts and the ports and passages will not be specifically described except in connection with the description of the various operations of the triple valve.

Charging the system.

Figure 1:
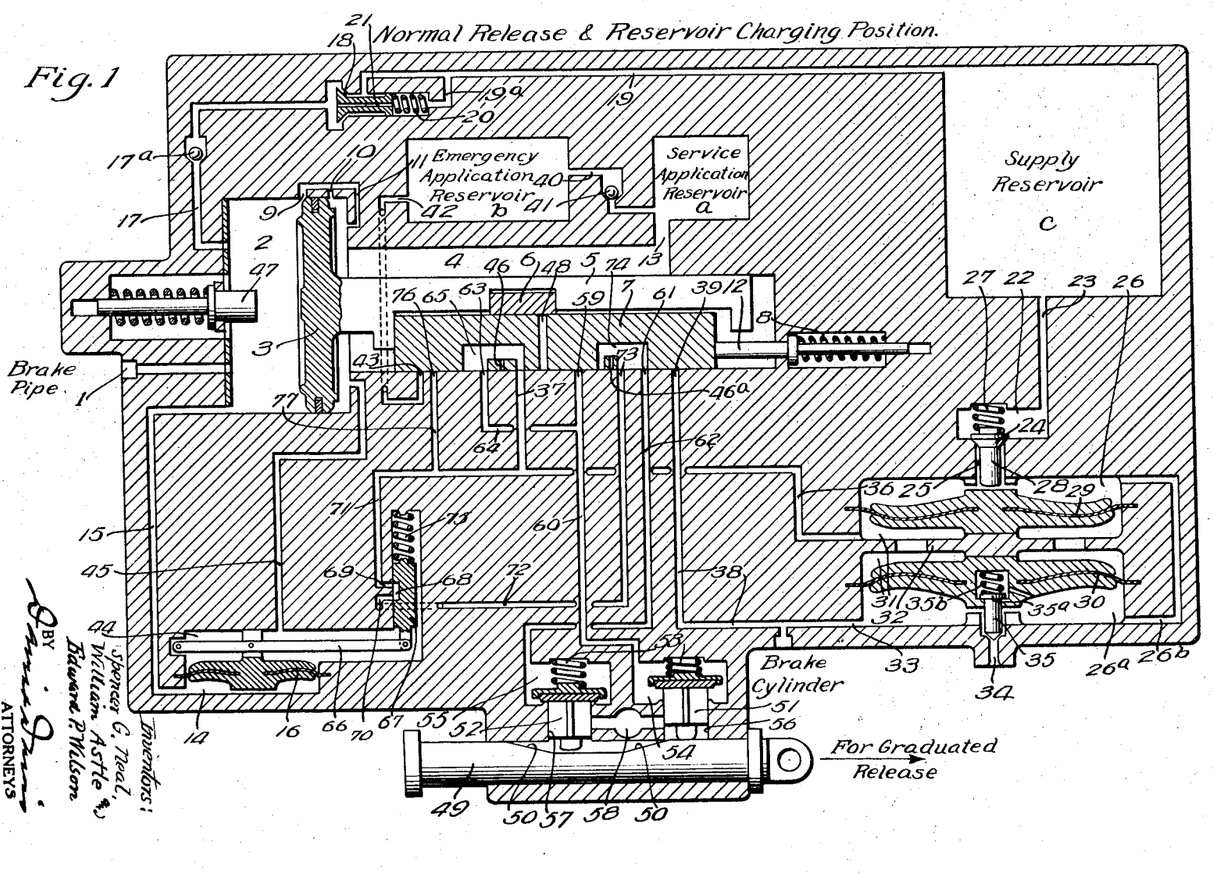
Fig. 1 is a diagrammatic view of a triple valve embodying the invention and showing the parts in normal release and reservoir charging position.

*Normal charging and normal release position Fig. 1.*—When charging the system air passes from the brake pipe through passage 1 to the main brake pipe chamber 2 in which is arranged the main operating piston 3. Connected to the chamber 2 is a main slide valve chamber 4. Piston 3 carries a piston stem 5 which extends longitudinally through the valve chamber 4 and is suitably guided therein. Chamber 4 is separated from chamber 2 by the piston 3. The piston stem is operatively connected to a graduating valve 6 and to a main slide valve 7, the main slide valve moving over a seat formed on the lower wall of the valve chamber 4 and the graduating valve operating on top of the main slide valve. There is a lost motion connection between the main slide valve and the piston stem and a direct positive connection between the graduating valve and the piston stem. The increase in pressure in chamber 2 forces the piston 3 inwardly and carries the main slide valve into engagement with a normal charging stop 12. This stop is held in its normal position by a spring 8 which yieldingly holds the valve and the main piston 3 in normal charging position. When the main operating piston is in normal charging position chamber 2 is in communication with chamber 4 through a by-pass port 9 so that chamber 4 will be normally charged through said by-pass port. The by-pass 9 is formed with two branches 10 and 11 which open into the chamber 4 the branch 11 having less capacity than branch 10 and the two branches having a capacity equal to the port 9. When the main piston is in retarded recharging position the passage 10 will be closed and the recharging will take place through the restricted branch port 11, as will be more fully hereinafter described. A service application reservoir $a$ is in direct open communication with chamber 4 through port 13 and will be charged from chamber 4. The main brake pipe chamber 2 is in direct open communication with an actuating chamber 14 through a passage 15 so that the actuating chamber will be charged directly from brake pipe and the main brake pipe chamber 2. The upper wall of the actuating chamber is formed by an actuating diaphragm 16.

The supply reservoir $c$, from which air is supplied for brake operations, is charged from the main brake pipe chamber 2 through a passage 17, past a non-return check valve 17$^a$, around a spring-pressed check valve 18 and through passage 19 which opens directly into the supply reservoir. The check valve 18 is normally held open as shown in Fig. 1 by a spring 20. The stem of the check valve is provided with a longitudinally extending restricted charging port 21 through which the supply reservoir will be charged when the check valve 18 is seated and in restricted recharging position as will be hereinafter described. The supply reservoir $c$ is in direct open communication with the application valve chamber 22 through passage 23 so that supply reservoir pressure will be registered in said chamber 22 above the application valve 24. A passage 25 leads from the application valve chamber 22 directly into a brake cylinder pressure chamber 26. The valve 24 seats on the margin of the upper end of this passage and closes communication between the supply reservoir and the brake cylinder pressure chamber. A spring 27 normally holds the application valve seated and said valve is provided with a depending stem 28 which extends into the brake cylinder pressure chamber. The lower wall of the chamber 26 is formed by a horizontally arranged diaphragm 29, said diaphragm, for convenience, being termed the application diaphragm. The lower end of the stem 28 engages the upper surface of the application diaphragm so that the application valve will be moved in response to the movements of said diaphragm, except that when the diaphragm is in its lowermost position, as shown in Fig. 1, there is a clearance to permit the valve 24 to firmly seat. Below the application diaphragm, and substantially parallel therewith, is arranged a release diaphragm 30. Between these two diaphragms is formed a control chamber 31. In this chamber is arranged a perforated web 32 which serves as a limiting stop to limit the inward movements of the diaphragms toward each other. Below the release diaphragm is formed a brake cylinder pressure chamber $26^a$ which is connected to the chamber 26 by an open passage $26^b$ so that the pressure in chambers 26 and $26^a$ will be always equalized and will be always brake cylinder pressure. The chamber $26^a$ is connected to a brake cylinder by passage 33. The chamber $26^a$ is formed with a brake cylinder exhaust port 34 directly below the center of the release diaphragm 30. The release diaphragm carries a brake cylinder exhaust valve 35 adapted to close the upper end of the port 34 and thereby close the brake cylinder exhaust. The control chamber 31 is connected by passage 36 to a port 37 in the main slide valve seat. The brake cylinder is connected by a passage 38 to an emergency port 39 in the main slide valve seat.

An emergency application reservoir $b$ is connected to the service application reservoir $a$ through a passage 40 in which is arranged a back-pressure check valve 41, said valve seating toward the reservoir $a$. The emergency application reservoir will be charged from the service application reservoir and the check valve 41 will prevent air passing back from the emergency application reservoir to the service application reservoir. The reservoir $b$ is connected by passage 42 to a port 43 in the main slide valve seat. This port is closed in all positions of the main slide valve except the emergency position, as will be hereinafter described. Above the actuating diaphragm 16 is formed a graduated release pressure chamber 44 and said chamber is in direct and open communication with the main valve chamber 4 through a passage 45 so that the pressure in the main valve chamber will always be registered in the graduated release chamber 44. The actuating diaphragm will be subject on one side to brake pipe pressure and on its other side to the pressure in the main valve chamber.

*Retarded release and restricted recharging position (Fig. 5).*

Figure 5:
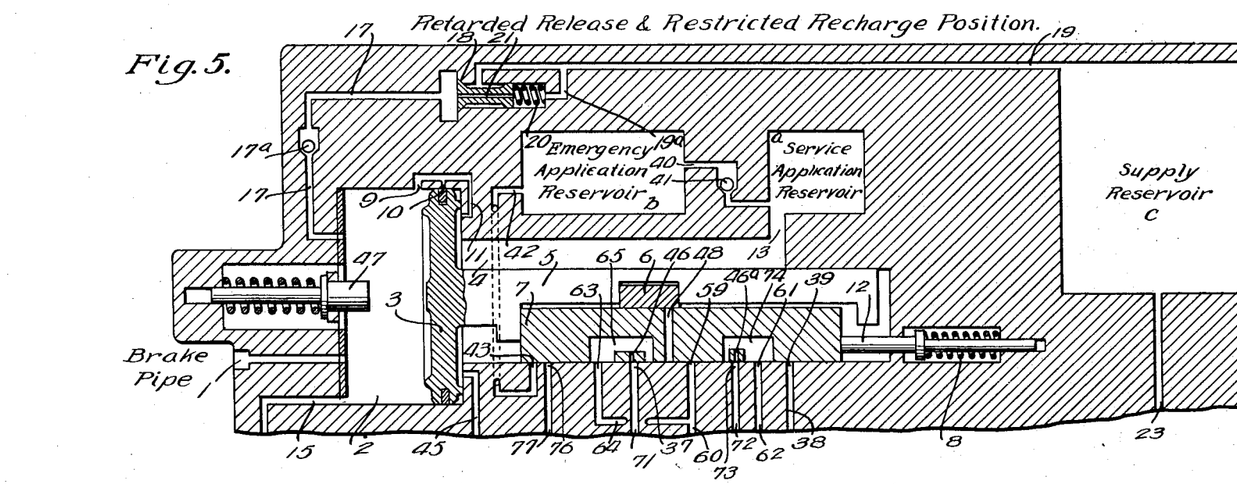
Fig. 5 a partial diagrammatic view showing the parts in retarded release and restricted recharging position.

When the brake pipe pressure in chamber 2 is rapidly increased, as for example on the forward portion of the train when the engineer's brake valve is placed in full release position, the main operating piston 3 will be forced to its extreme inner position to a fixed stop formed by the inner wall of the chamber in which the piston 3 reciprocates. This extreme inward movement of the piston will cause the main slide valve to move the normal stop 12 inwardly against the tension of the spring 8. With the piston 3 in its extreme inner position the charging port 10 is blanked by the piston and the charging will thereafter take place through the restricted port 11. The high pressure brake pipe air will flow past check valve $17^a$ and will force the check valve 18 to its seat against the resistance of spring 20 and the supply reservoir will then be charged through the restricted charging port 21 through the check valve 18. When the check valve 18 is seated the normal charging port connected to passage 19 will be closed and air will pass through the restricted port 21 and then through a branch passage $19^a$ into the passage 19. The service application reservoir and the emergency application reservoir will be charged from the main brake pipe chamber 4 as hereinbefore described. When the main slide valve is in restricted recharging position a restricted release port 46 will be brought into register with the port and passage 37 to restrict the release of pressure from the control chamber 31, as will be more fully hereinafter described.

When the pressure in chamber 4 becomes approximately equal to the brake pipe pressure in chamber 2 spring 8 will return the main slide valve 7 and the piston 3 to normal release and normal charging position as shown in Fig. 1. The pressure in chamber 4 will then quickly and completely equalize with the pressure in chamber 2 through the normal charging ports. When the supply reservoir pressure approximately equalizes with the brake pipe pressure spring 20 will force valve 18 from its seat, whereupon the supply reservoir will completely equalize with the brake pipe pressure.

*Running position (Fig. 1).*

When the system is fully charged there is an equalization of pressures in chambers 2, 4, 14 and 44 and in reservoirs *a*, *b* and *c*. The application valve will be held closed by the pressure in chamber 22 and there will be no pressure in chambers 26, 26ª and 31.

*Service application position (Fig. 2).*

Figure 2:
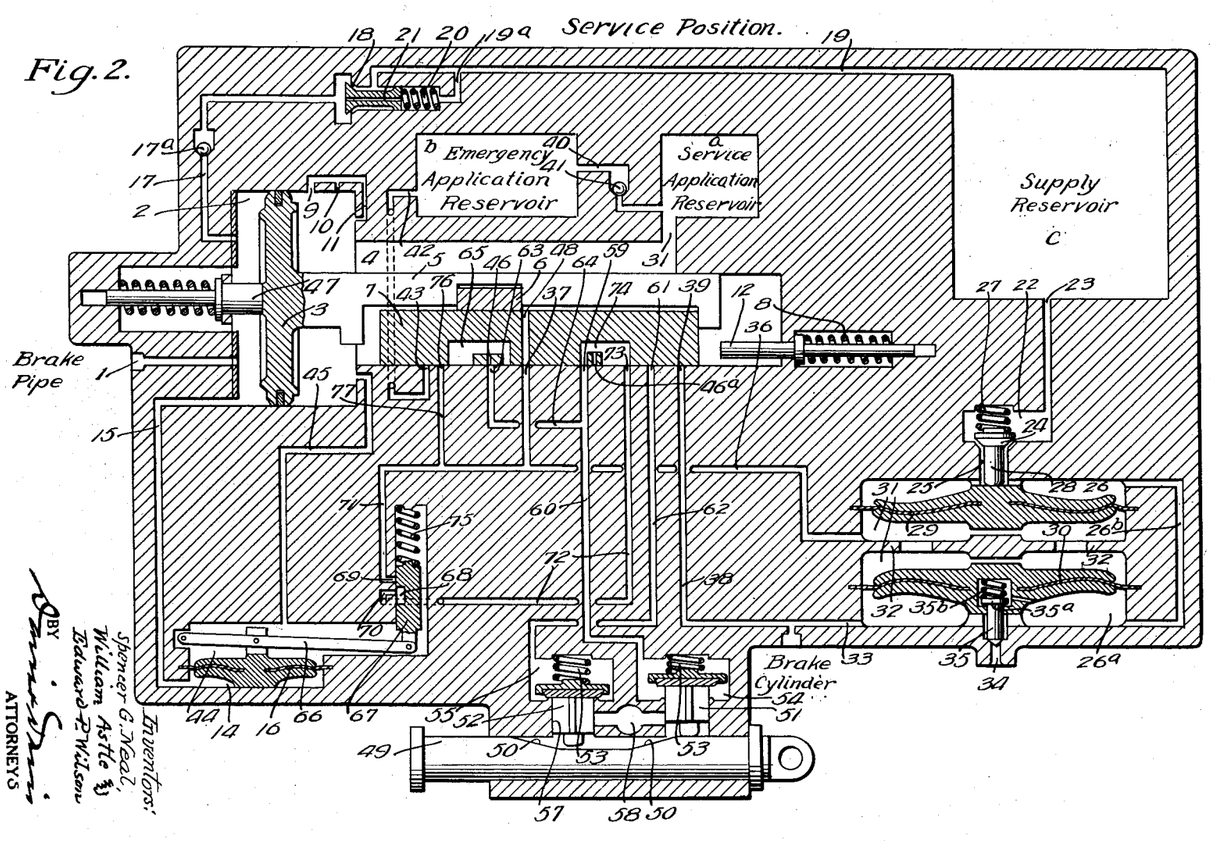
Fig. 2 a view similar to Fig. 1 showing the parts in service application position.

To obtain a service application of the brakes a service brake pipe reduction is made in the usual manner through the engineer's brake valve. This service reduction of brake pipe pressure is registered directly in the main brake pipe chamber 2. The pressure in chamber 4 forces the piston 3 toward the left, as viewed in the drawings, until it is stopped by the yielding spring-pressed plunger 47, which constitutes a service stop and arrests the piston and the valves connected therewith in service application position. This movement carries the piston 3 beyond the charging port 9, thereby preventing the flow of air from chamber 4 and reservoir *a* back to the brake pipe. The piston 3 carries with it the main slide valve 7 and the graduating valve 6. The movement of the graduating valve on the main slide valve opens application port 48 in the main slide valve, and the movement of the main slide valve places said application port in register with port 37 which leads through passage 36 to the control chamber 31. Air will flow from chamber 4 and service application reservoir to the control chamber. Port 48 is so proportioned that the rate of pressure reduction in chamber 4 and in service application reservoir *a* is equal to the rate of pressure reduction in chamber 2 when a service brake pipe reduction is made. This equal rate of pressure drop, plus the resistance of the service spring when the piston is in engagement with the service stop 47, causes the piston and the main slide valve to stop at and remain in service position. When the pressure in chamber 4 drops slightly below that in chamber 2 the piston 3 will be moved inwardly or toward the right, as viewed in the drawings, by the superior pressure in chamber 2 and will carry with it the graduating valve 6 to service lap position. In this position the graduating valve closes port 48 thereby preventing further flow of air from chamber 4.

The volume of chamber 31 is so proportioned to the volume of service application reservoir *a* and the valve chamber 4 as to give the desired ratio between the brake pipe reduction and the pressure in the control chamber 31. For example the volume of the various reservoirs and chambers may be so proportioned that a ten pound brake pipe pressure reduction will result in a build-up of a twenty-five pound pressure in the control chamber 31 before the graduating valve is moved to lap position. It will, of course, be understood that the ratio of pressure developed in the chamber 31 may be varied to any desired extent.

The pressure built up in the pressure control chamber 31 forces the release diaphragm 30 downwardly and seats the brake cylinder exhaust valve 35. This pressure build-up also forces upwardly the application diaphragm 29 and opens the application valve 24. When the application valve is opened supply reservoir air will flow from chamber 22 through passage 25 into the brake cylinder pressure chamber 26 and then through passage 26ᵇ into chamber 26ª and to the brake cylinder through passage 33. When the brake cylinder pressure equals the pressure in the control chamber 31 the application diaphragm 29 will be moved downwardly and valve 24 will be seated by the application valve spring 27. The brake cylinder pressure balanced against the pressure in the control chamber 31 is the determining factor in closing the application valve 24. Brake cylinder pressure will, therefore, be built up in the brake cylinder without regard to brake cylinder piston travel and without regard to the brake cylinder leaks. A clearance is provided between the head 35ª of the exhaust valve 35 and the support for the diaphragm 30, so that when the pressures are equalized upon the two sides of the diaphragm 30 said diaphragm may take a middle position without opening valve 35. The spring 35ᵇ and the pressure in chamber 26ª hold the valve 35 to its seat and the diaphragm 30 in its middle position.

If the brake cylinder pressure be reduced by leakage the balance of pressures on the application diaphragm is destroyed and the undisturbed pressure in the control chamber 31 will move the application diaphragm to open the application valve 24. Air will again flow from the supply reservoir to the brake cylinder to supply the pressure lost by leakage.

When a service reduction of brake pipe pressure is made in chamber 2 there is a corresponding reduction of pressure in chamber 14 and the superior pressure in chamber 44 will then depress the actuating diaphragm 16 and move downwardly the release control valve connected thereto. (See Fig. 2.)

When the pressure in chamber 4, and also in chamber 44, has been reduced slightly below the pressure in chamber 2 to permit the main piston to move the graduating valve to service lap position, the release control valve spring will hold the actuating diaphragm and the release control valve in their depressed or lowered positions. This spring is of sufficient strength and has sufficient tension to prevent the slightly greater pressure in chamber 14 from raising the actuating diaphragm 16. The operation of the release control valve is hereinafter fully described in connection with the release operation.

Normal release.

*Quick release.*—The triple valve is provided with a release governing mechanism. This mechanism consists of a manually operable rod 49 provided with suitable limiting stops near its ends. This rod is formed with a cavity in one side, the ends of said cavity being inclined to form valve operating cams 50. A quick release valve 51 and a graduated release valve 52 are provided; and these valves are arranged to be operated by the cams 50 on the rod 49. These valves are normally held seated by springs 53 arranged in valve chambers 54 and 55. A quick release port 56 controlled by the quick release valve 51 and a graduated release port 57 controlled by the graduated release valve 52, lead to an atmospheric port 58. The quick release valve chamber 54 is connected to a port 59 in the main slide valve seat by passage 60. The graduated release valve chamber 55 is connected to a port 61 in the main slide valve seat by passage 62. The quick release passage 60 is connected to a port 63 in the main slide valve seat by a branch passage 64.

The operating rod 49 is forced inwardly toward the left as viewed in Fig. 1 to force the quick release valve 51 to open position and to permit the graduated release valve 52 to close. The quick release chamber 54 is thereby placed in open communication with the atmospheric port 58. This is the position of the operating rod illustrated in Figs. 1, 2 and 3 of the drawings.

For a quick release of the brakes after a service application, the release governing valve rod being in quick release position, the brake pipe pressure is increased a normal amount in the usual manner. The increase in brake pipe pressure will be registered in chamber 2 and will prevail over the pressure in chamber 4 and force the piston 3 and the main slide valve 7 to normal release position (see Fig. 1). The port 59 will be closed by the main slide valve. Port 63 will be in register with release cavity 65 in the main slide valve. Cavity 65 is also in communication with port 37, said port being in communication with the control chamber through passage 36. Port 63 is in communication with the quick release valve chamber 54 through passage 60. It is clear therefore that the pressure in the control chamber 31 will be quickly released to atmosphere through the atmospheric port 58. The reduction of pressure in chamber 31 will permit the brake cylinder pressure under the release diaphragm 30 to open the brake cylinder exhaust valve 35 so that brake cylinder pressure will be exhausted to atmosphere through the exhaust port 34.

The increase of brake pipe pressure in chamber 2 will result in a corresponding increase of pressure in the actuating chamber 14 and said increase of pressure will force the actuating diaphragm 16 upwardly. A lever 66 is pivotally connected to an upwardly extending central stem of the actuating diaphragm. This lever is pivoted at one end in the valve casing, its other end being pivotally connected to a release control valve 67. The upward movement of the actuating diaphragm results in an upward movement of the release control valve. This valve is formed with a cavity 68 which in the upper position of said valve connects a port 69 with a port 70. Port 69 is connected by a passage 71 to the passage 36 leading to the control chamber. Port 70 is connected by a passage 72 to a port 73 in the main slide valve seat. In the release position of the main slide valve port 73 opens into a cavity 74 in the main slide valve, said cavity placing port 73 in communication with port 61 of the passage 62 which leads to the graduated release valve chamber 55. In the quick release position of the rod 49 the graduated release valve 52 is closed and therefore the operation of the release control valve 67 is an idle operation in quick release operations.

The actuating diaphragm 16 will be raised by the pressure in chamber 14 almost immediately upon an increase of pressure in chamber 2. The release control valve 67 will, therefore, immediately respond to an increase of pressure in chamber 2. The result of this will be that the release control valve will be moved upwardly to release position before the main slide valve starts toward release position. In the service position and service lap position of the main slide valve port 59 is in communication with port 73 through the cavity 74 in the main slide valve. It is therefore clear that control chamber pressure will be exhausted to atmosphere through the open quick release valve the instant the release control valve is in release position and before the main slide valve starts toward release position. This insures a quick release of brake cylinder pressure because the control chamber pressure will be partly released through the release control valve before the pressure has been sufficiently built up in chamber 2 to move the piston 3 and the main slide valve to release position. If the main slide valve sticks in service lap position the control chamber pressure will be released to atmosphere through passages 36 and 71, release control valve, passage 72, port 73, cavity 74 of the main slide valve, port 59, passage 60 and quick release valve chamber 54. This will ensure a prompt release of brake cylinder pressure even should the main slide valve stick in service lap position. The release control valve assures a positive and prompt release of the brakes, particularly toward the end of a long train where it is difficult to properly increase the brake pipe pressure sufficiently to overcome the resistance of the main slide valve. The release control valve will move to release position on a slight increase in brake pipe pressure and air will begin to exhaust from the control chamber before the brake pipe pressure has been sufficiently increased to move the main slide valve. This will result in a prompt release of brake cylinder pressure even at the end of a long train.

Upon an equalization of pressure in chambers 2 and 4 there will be a corresponding equalization of pressure in chambers 14 and 44 on opposite sides of the actuating diaphragm and the release control valve 67 will be moved downwardly to lap position by the release control valve spring 75 (see Fig. 2).

The reservoirs will be normally charged in the normal release position of the parts, as hereinbefore described.

Retarded release.

*Quick release, Fig. 5.*—If the brake pipe pressure should be rapidly and abnormally increased during the release operations the rapid increase of pressure in chamber 2 would force the piston 3 and the main slide valve 7 to retarded release and retarded recharging position and compress the spring 8 (see Fig. 5) as hereinbefore described. This movement of the main slide valve will carry the restricted release port 46 into register with port 37 so that the control chamber pressure will be slowly released through said restricted port. The triple valves at the head end of the train will be moved to retarded release position. The pressure in chamber 31 will therefore be reduced slowly at the head end of the train and the brake cylinder pressure will be reduced at a rate proportionate to the reduction in pressure in chamber 31. By thus prolonging the time during which brake cylinder pressure is being released at the head end of the train, a sufficient time interval is allowed for the release to become effective on the rear cars, thereby reducing the danger of the train breaking in two. Trains are frequently broken or pulled apart because the brakes at the head end of the train are released before the brakes are released at the rear end of the train. The piston 3 will be moved into position to close the charging port 10 so that chamber 4 will be slowly recharged through the restricted charging port 11. The check valve 18 will be seated so that the supply reservoir will be slowly recharged through the restricted recharging port 21, as hereinbefore described. When there is an equalization of pressures on opposite sides of the piston 3 the spring 8 will move the main slide valve and the piston 3 to normal charging position (see Fig. 1).

Figure 4:
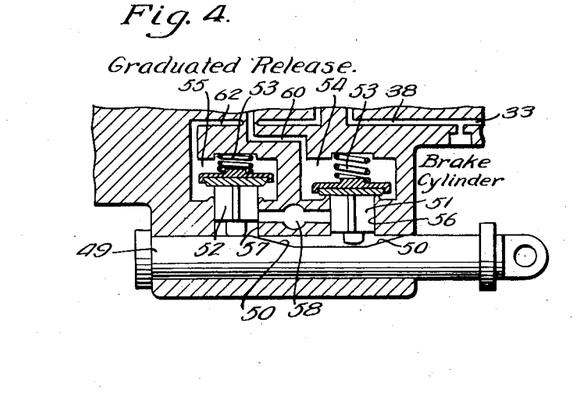
Fig. 4 a detail diagrammatic view of the release governing valve mechanism showing the parts in graduated release position.

Graduated release. Figs. 1 and 4.

When operating the triple valve in graduated release the release governing valve rod 49 is moved to the right, as viewed in the drawings and as shown in Fig. 4. This results in the closure of the quick release valve 51 and the opening of the graduated release valve 52.

To effect a release of brake cylinder pressure after a service application, when operating in graduated release, the brake pipe pressure is increased in the usual manner. If it is desired to effect a full release of the brake cylinder pressure the brake pipe pressure is raised to normal running pressure. If a partial release of the brakes is desired the brake pipe pressure is only partially restored. Assuming that a full release of the brake cylinder pressure is desired the brake pipe pressure is increased in the usual manner and the piston 3 and the main slide valve will be moved to normal release position, or to retarded release position, depending upon the increase of brake pipe pressure. For graduated release operations the increase in brake pipe pressure must exert a force upon piston 3 sufficient to move said piston to the right to open the charging groove 9 and to move the main slide valve 7 to connect port 73 to port 61, and the diaphragm 16 must be moved to carry the release control valve 67 to release position to thereby connect port 69 to port 70. The movement of the main slide valve to release position or to retarded release position, in graduated release operations, does not vary the rate of release because the rate of release of control chamber pressure in graduated release operations is controlled entirely by the release control valve 67. The increase in brake pipe pressure in chamber 2 is practically instantly registered in the actuating chamber 14 and the actuating diaphragm is raised and the release control valve is placed in release position. The control chamber will be connected through passages 36 and 71 to port 69, cavity 68 in the release control valve, port 70, passage 72, port 73, cavity 74 of the main slide valve, port 61, passage 62 to the graduated release valve chamber 55. The graduated release valve 52 is opened so that pressure may flow from chamber 55 past valve 52 to the atmospheric port 58. The release control valve 67 will remain in release position until there is an equalization of pressures in chambers 14 and 44. When this equalization takes place spring 75 will move valve 67 downwardly to lap position, thereby closing port 69.

To effect a partial release of the brake cylinder pressure the brake pipe pressure is increased the desired amount less than the normal running pressure. The result of increasing brake pipe pressure will be to increase the pressure in chamber 4 through the charging ports and to increase the pressure in the actuating chamber 14. This increase in pressure in chamber 14 will move the diaphragm 16 upwardly thereby placing the release control valve in release position. This will result in a reduction of pressure in the control chamber 31. The brake cylinder pressure in chamber 26$^a$ will lift the release diaphragm 30 and open the brake cylinder exhaust valve 35. When the pressures in chambers 2 and 4 have equalized there will be an equalization of pressures in chambers 14 and 44 with the result that the release control valve will be moved downwardly to lap position by the spring 75. This will stop the exhaust of pressure of the control chamber 31. When the brake cylinder pressure has been exhausted to a point slightly below the remaining pressure in the control chamber the exhaust valve 35 will be closed by the superior pressure in the control chamber. A partial restoration of the brake pipe pressure will result in a partial release of pressure from the control chamber. The amount of brake cylinder pressure retained in the brake cylinder will depend upon the amount of pressure retained in the control chamber, the brake cylinder pressure being dependent upon the pressure established in the control chamber. The size of passage 62 is proportioned so that the pressure may escape from chamber 31 in approximately the same time as is required to recharge service application reservoir $a$ through the charging port 9. Brake cylinder pressure can therefore be graduated off in steps as the reservoir $a$ is recharged, brake cylinder pressure being completely dissipated when reservoir $a$ is fully charged. The pressure in the brake cylinder is determined by the pressure remaining in chamber 31 and will be maintained at that pressure until a further change of pressure takes place in said chamber 31. The reduction of pressure in chamber 31 during graduated release operations is dependent upon the time during which valve 67 connects ports 69 and 70 and this in turn is dependent upon the time necessary to return reservoir $a$ to an equality with the increased brake pipe pressure.

By increasing the brake pipe pressure in steps the brake cylinder pressure may be reduced in steps or graduated off. It is therefore manifest that by increasing or decreasing the brake pipe pressure the brake cylinder pressure may be correspondingly decreased or increased as desired. When the pressure in chamber 4 has been fully restored to original running pressure the control chamber 31 will be wholly exhausted and at the same time the pressure in the brake cylinder chambers 26 and 26$^a$ will be reduced to atmospheric pressure.

The main slide valve 7 is provided with a restricted release port 46$^a$ which, when the main slide valve is in retarded release position, as shown in Fig. 5, is in register with port 73 in the main slide valve seat. When the release governing valve mechanism is in graduated release position and the main slide valve is in retarded release position the control chamber pressure will be slowly exhausted through the release control valve, as hereinbefore described, then through port 73 and the restricted release port 46$^a$ and thence out through the graduated release valve as hereinbefore described. The restricted release port 46$^a$ is smaller than the port 61 so that the release of pressure from control chamber 31 will be in proper proportion to the restricted re-charging of chamber 4 through the passage 11 when the main slide valve 7 is in retarded release position. The restricted release port 46 provides for a retarded release when the triple valve is operating in quick release and the restricted port 46$^a$ provides for a retarded release when the valve is operating in graduated release.

Figure 3:
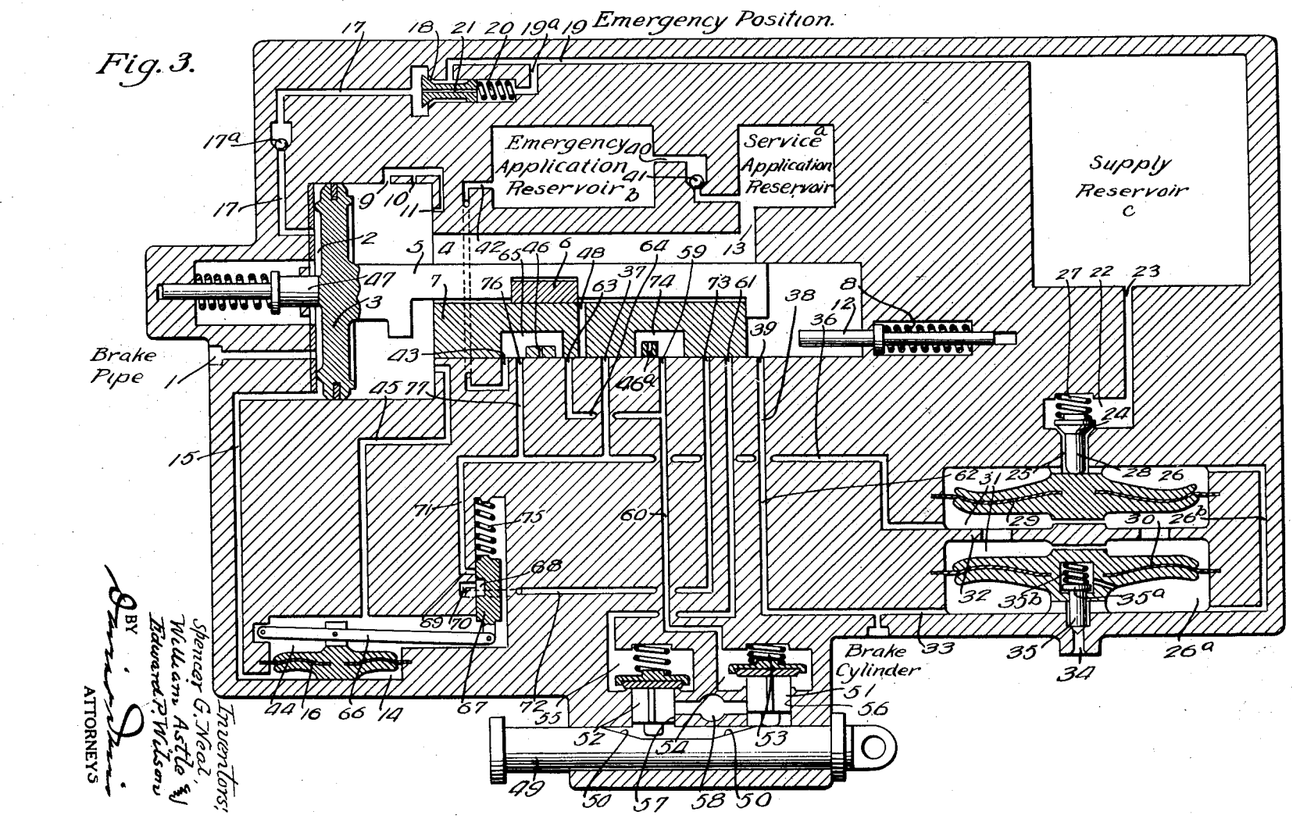
Fig. 3 a view similar to Fig. 1 showing the parts in emergency application position.

*Emergency application. Fig. 3.*

For an emergency application of the brakes an emergency reduction in brake pipe pressure is made in the usual manner. This rapid reduction in pressure is registered in chamber 2. The pressure in chamber 4 cannot be reduced at an equal rate through port 48 with the result that the piston 3 will be moved to its extreme position toward the left, as viewed in the drawings, compressing the service stop spring and seating against a sealing gasket arranged in chamber 2. The main slide valve will be moved to emergency position, in which position port 43 will be connected by the cavity 65 of the main slide valve to a port 76 in the main slide valve seat. Port 76 is connected by a passage 77 to the passage 71, this latter passage being connected to passage 36 which leads to the control chamber. The emergency application reservoir $b$ will therefore be connected to the control chamber and the pressure in said reservoir and in the control chamber will equalize at a point corresponding to the volume relations of these two chambers, thereby giving a predetermined pressure in chamber 31. The emergency application reservoir $b$ is of greater volume than the service application reservoir $a$ and when said volume is equalized into chamber 31 the resulting pressure will be higher than would be the pressure resulting from an equalization of pressures in reservoir $a$ and the control chamber. This ensures a predetermined high pressure in the control chamber for emergency applications of the brakes. The emergency application reservoir is sealed at all times except in emergency applications and is then discharged directly into the control chamber.

The emergency pressure in chamber 31 will act on the diaphragms 29 and 30 in the same manner as set forth in connection with the description of a service application. The application valve 24 will be opened and air from the supply reservoir $c$ will flow to the brake cylinder until the brake cylinder pressure equals the emergency pressure in chamber 31. When this brake cylinder pressure has been produced, diaphragm 29 will move downwardly as heretofore described, permitting valve 24 to close.

The sudden and excessive reduction in pressure in chamber 2 will result in a corresponding reduction of pressure in chamber 14 with the result that the superior pressure in chamber 44 will move the diaphragm 16 downwardly and carry the release control valve to lap position (see Fig. 3).

In the emergency position of the main slide valve the emergency port 39 will be uncovered and the service application reservoir and chamber 4 will be equalized with the brake cylinder pressure. If the brake cylinder volume is very large, or the pressure in the supply reservoir has been abnormally reduced so that there is not sufficient pressure in the supply reservoir to build up a brake cylinder pressure equal to the emergency pressure in the control chamber, the supply reservoir air will flow to the brake cylinder until there is an equalization of pressures in said reservoir and in the brake cylinder. The supply reservoir is of large volume to ensure an ample supply of air for service braking and for emergency braking under normal operative conditions so that an emergency application may be had following a full service application of the brakes. The emergency application reservoir is provided for the sole purpose of producing emergency pressure in the control chamber when the main slide valve is moved to emergency position. Emergency pressure in the control chamber ensures emergency pressure in the brake cylinder or an equalization of the pressures in the service application reservoir and the supply reservoir and the brake cylinder.

A release of the brake cylinder pressure following an emergency application is obtained by increasing the brake pipe pressure in chamber 2 above the brake cylinder pressure registered in chamber 4 so as to move the piston 3 and the main slide valve 7 to release position. When the main slide valve is in release position the release of brake cylinder pressure and the recharging of the various reservoirs takes place as hereinbefore described. A vent valve, or other well known means, may be used to vent the brake pipe to atmosphere when an emergency reduction is made, to thereby assist in propagation of the emergency action throughout the train.

What we claim is:—

1. In a fluid pressure brake the combination with a supply reservoir and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure equal to the desired brake cylinder pressure said established pressure moving the application valve to open position, and means operating upon an increase in brake pipe pressure to exhaust air from said control chamber.

2. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, and a main slide valve and a graduating valve connected to said piston and operated by a reduction of brake pipe pressure to establish in the said control chamber a pressure equal to the desired brake cylinder pressure said established pressure moving the application valve to open position, the piston and main slide valve operating upon an increase in brake pipe pressure to exhaust air from said control chamber.

3. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a reduction of brake pipe pressure to establish in the said control chamber a pressure equal to the desired brake cylinder pressure said established pressure moving the application valve to open position, the piston and main slide valve operating to release position upon an increase in brake pipe pressure to exhaust air from said control chamber, and a manually operable quick release valve to afford a quick and free release of control chamber pressure when the main slide valve is in release position.

4. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated to service application position by a reduction of brake pipe pressure to establish in the said control chamber a pressure equal to the desired brake cylinder pressure said established pressure moving the application valve to open position, the piston and main slide valve operating to release position upon an increase in brake pipe pressure to exhaust air from said control chamber, a manually operable quick release valve to afford a quick and free release of control chamber pressure when the main slide valve is in release position, a release control valve operated to release position by an increase of brake pipe pressure, and means whereby the release control valve in release position will connect the control chamber to the quick release valve with the main slide valve in service position.

5. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated to service position by a reduction of brake pipe pressure to establish in the said control chamber a pressure equal to the desired brake cylinder pressure said established pressure moving the application valve to open position, the piston and main slide valve operating to release position upon an increase in brake pipe pressure to exhaust air from said control chamber, a manually operable graduated release valve, a release control valve operated to release position by an increase of brake pipe pressure, and means whereby the release control valve in release position will connect the control chamber to the graduated release valve when the main slide valve is in release position.

6. A fluid pressure brake comprising a main slide valve movable to service application position upon a reduction of brake pipe pressure and movable to release position upon an increase of brake pipe pressure, a release control valve movable to release position upon an increase of brake pipe pressure, and means whereby the release control valve in release position will permit the brake cylinder pressure to exhaust while the main slide valve is in service position.

7. A fluid pressure brake comprising a main slide valve movable to service application position upon a reduction of brake pipe pressure and movable to release position upon an increase of brake pipe pressure, a release control valve movable to release position upon an increase of brake pipe pressure, a manually operable quick release valve, and means whereby the release control valve in release position will co-operate with the quick release valve when the main slide valve is in service position.

8. A fluid pressure brake comprising a main slide valve movable to service application position upon a reduction of brake pipe pressure and movable to release position upon an increase of brake pipe pressure, a release control valve movable to release position upon an increase of brake pipe pressure, a manually operable quick release valve, means whereby the release control valve in release position will co-operate with the quick release valve when the main slide valve is in service position, and means whereby the main slide valve in release position will co-operate with the quick release valve independently of the release control valve.

9. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a reduction of brake pipe pressure to establish in the said control chamber a pressure equal to the desired brake cylinder pressure said established pressure moving the application valve to open position, the piston and main slide valve operating to release position upon an increase in brake pipe pressure to exhaust air from said control chamber, a quick release valve, a graduated release valve, manually operable means for opening one and closing the other of said release valves, a release control valve operated to release position by an increase of brake pipe pressure, means whereby the release control valve in release position will connect the control chamber to the quick release valve with the main slide valve in service position, means whereby the main slide valve will connect the control chamber to the quick release valve independently of the release control valve when the main slide valve is in release position, and means whereby the main slide valve will connect the control chamber to the graduated release valve when the main slide valve is in release position.

10. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a reduction of brake pipe pressure to establish in the said control chamber a pressure equal to the desired brake cylinder pressure said established pressure moving the application valve to open position, the piston and main slide valve operating to release position upon an increase in brake pipe pressure to exhaust air from said control chamber, means whereby an excessive increase in brake pipe pressure will move the main slide valve to restricted release position, and means whereby the main slide valve in restricted release position will restrict the release of pressure from the control chamber.

11. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a reduction of brake pipe pressure to establish in said control chamber a pressure equal to the desired brake cylinder pressure said established pressure moving the application valve to open position, the piston and main slide valve operating to release position upon an increase in brake pipe pressure to exhaust air from the said control chamber, a manually operable quick release valve to afford a quick and free release of control chamber pressure when the main slide valve is in release position, means whereby an excessive increase in brake pipe pressure will move the main slide valve to restricted release position, and means whereby the main slide valve in restricted release position will restrict the release of pressure from the control chamber through the quick release valve.

12. In a fluid pressure brake the combination of a supply reservoir, a service application reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve operated by a service reduction of brake pipe pressure to connect the service application reservoir to the control chamber to establish in said chamber a service braking pressure the established pressure moving the application valve to open position, a quick release valve, a graduated release valve, manually operable means for alternately opening and closing the said release valves, a release control valve, means operated by the opposed pressures of the brake pipe and the service application reservoir for moving said release control valve said valve being moved to release position by an increase of brake pipe pressure, means whereby the release control valve in release position will connect the control chamber to the quick release valve when the main slide valve is in service position and to the graduated release valve when the main slide valve is in release position, and means whereby the main slide valve in release position will connect the control chamber to the quick release valve independently of the release control valve.

13. In a fluid pressure brake the combination of a supply reservoir, a service application reservoir, an emergency application reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a service reduction of brake pipe pressure to connect the service application reservoir to the control chamber to establish in the said control chamber a service braking pressure and operated by an emergency reduction of brake pipe pressure to connect the emergency application reservoir to the control chamber to establish therein an emergency braking pressure the established pressure moving the application valve to open position, and means operating upon an increase in brake pipe pressure to exhaust air from said control chamber.

14. In a fluid pressure brake the combination of a supply reservoir, a service application reservoir, an emergency application reservoir, a brake cylinder chamber, an application valve controlling comunication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a service reduction of brake pipe pressure to connect the service application reservoir to the control chamber to establish in the said control chamber a service braking pressure and operated by an emergency reduction of brake pipe pressure to connect the emergency application reservoir to the control chamber to establish therein an emergency braking pressure the established pressure moving the application valve to open position, the piston and the main slide valve operating upon an increase in brake pipe pressure to exhaust air from said control chamber.

15. In a fluid pressure brake the combination of a supply reservoir, a service application reservoir, an emergency application reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a service reduction of brake pipe pressure to connect the service application reservoir to the control chamber to establish in the said control chamber a service braking pressure and operated by an emergency reduction of brake pipe pressure to connect the emergency application reservoir to the control chamber to establish therein an emergency braking pressure said established pressure moving the application valve to open position, means operating upon an increase in brake pipe pressure to exhaust air from said control chamber, and means whereby an emergency reduction of brake pipe pressure will place the service application reservoir in direct communication with the brake cylinder chamber.

16. In a triple valve for an air brake apparatus the combination of a piston and a main slide valve connected thereto and operating to release position upon an increase in brake pipe pressure, a manually operable quick-release valve to afford a quick and free release of brake cylinder pressure when the main slide valve is in release position, a manually operable graduated release valve to afford a slow release of brake cylinder pressure when the main slide valve is in release position, means whereby the quick release valve and the graduated release valve may be alternately opened and closed and one or the other of said valves will be open at all times, means whereby an excessive increase in brake pipe pressure will move the main slide valve to restricted release position, and means whereby the main slide valve in restricted release position will retard the release of brake cylinder pressure with the quick release valve or the graduated release valve in open position.

17. In a fluid pressure brake the combination of a supply reservoir, a brake cylinder chamber, an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, a piston, a main slide valve and a graduating valve connected to said piston and operated by a reduction of brake pipe pressure to establish in said control chamber a pressure equal to the desired brake cylinder pressure said established pressure moving the application valve to open position, the piston and main slide valve operating to release position upon an increase in brake pipe pressure to exhaust air from the said control chamber, a manually operable graduated release valve to afford a slow release of control chamber pressure when the main slide valve is in release position, means whereby an excessive increase in brake pipe pressure will move the main slide valve to restricted release position, and means whereby the main slide valve in restricted release position will restrict the release of pressure from the control chamber through the graduated release valve.

18. In a fluid pressure brake the combination with a supply reservoir, a service application reservoir and a brake cylinder, of an application valve device governed by the opposing pressures of the brake cylinder and a control chamber for supplying fluid from the supply reservoir to the brake cylinder, means operated by a reduction of brake pipe pressure to establish in the said control chamber a pressure equal to the desired brake cylinder pressure said established pressure moving the application valve to application position, a release control valve subject to brake pipe and service application reservoir pressures and operated to release position by an increase of brake pipe pressure, means to move said release control valve to lap position upon an equalization of pressures in the brake pipe and in the service application reservoir, a manually operable graduated-release valve, and means whereby the release control valve in release position will connect the control chamber to the graduated-release valve when the main slide valve is in release position.

19. In a fluid pressure brake the combination with a supply reservoir, a service application reservoir, and a brake cylinder chamber, of an application valve controlling communication between the supply reservoir and the brake cylinder chamber, a control chamber, means adapted to be moved by the opposed pressures of the control chamber and the brake cylinder chamber for opening and closing said application valve, a brake cylinder exhaust valve, means adapted to be moved by the opposed pressures of the control chamber and the brake cylinder chamber for opening and closing said exhaust valve, means operated by a reduction of brake pipe pressure to establish in the said control chamber a pressure equal to the desired brake cylinder pressure said established pressure moving the application valve to open position, a release control valve subject to brake pipe and service application reservoir pressures and operated to release position by an increase of brake pipe pressure, means to move said release control valve to lap position upon an equalization of pressures in the brake pipe and in the service application reservoir, a manually operable graduated-release valve, and means whereby the release control valve in release position will connect the control chamber to the graduated-release valve when the main slide valve is in release position.

In testimony whereof we hereunto affix our signatures.

SPENCER G. NEAL.
WILLIAM ASTLE.
EDWARD P. WILSON.